(12) United States Patent
Shannon

(10) Patent No.: US 8,719,907 B2
(45) Date of Patent: *May 6, 2014

(54) COMPUTERIZED AUTHORIZATION SYSTEM AND METHOD

(75) Inventor: Gary Martin Shannon, Cheshunt (GB)

(73) Assignee: Gary Martin Shannon, Hoddesdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,780

(22) Filed: May 11, 2012

(65) Prior Publication Data

US 2012/0240198 A1 Sep. 20, 2012

Related U.S. Application Data

(63) Continuation of application No. 13/426,467, filed on Mar. 21, 2012.

(51) Int. Cl.
*H04L 29/06* (2006.01)

(52) U.S. Cl.
CPC ...................................... *H04L 63/08* (2013.01)
USPC ........ 726/4; 726/5; 726/18; 726/21; 713/156; 713/158; 713/172; 713/173; 713/174; 705/64; 705/65; 705/66; 705/70; 705/75

(58) Field of Classification Search
CPC ...................................................... H04L 63/08
USPC .......................... 705/64–75; 726/4–5, 18, 21; 713/156–158, 172–174
See application file for complete search history.

(56) References Cited

U.S. PATENT DOCUMENTS

| | | | |
|---|---|---|---|
| 5,754,657 A | 5/1998 | Schipper et al. | |
| 5,757,916 A | 5/1998 | MacDoran et al. | |
| 5,875,296 A | 2/1999 | Shi et al. | |
| 5,970,472 A * | 10/1999 | Allsop et al. | ............... 705/26.81 |
| 6,029,154 A * | 2/2000 | Pettitt | ............................. 705/44 |
| 7,043,635 B1 | 5/2006 | Keech | |

(Continued)

FOREIGN PATENT DOCUMENTS

| | | |
|---|---|---|
| EP | 1613017 | 1/2006 |
| EP | 1796324 | 6/2007 |

(Continued)

OTHER PUBLICATIONS

Sampo Sovio, N. Asokan, Kaisa Nyberg, Defining Authorization Domains Using Virtual Devices, Jan. 27-31, 2003, IEEE, pp. 1-6.*

(Continued)

*Primary Examiner* — Bradley Holder
*Assistant Examiner* — Fahimeh Mohammadi
(74) *Attorney, Agent, or Firm* — Saliwanchik, Lloyd & Eisenschenk

(57) ABSTRACT

A computerized authorization system configured to authorize electronically-made requests to an electronic entity. The computerized authorization system comprises a store configured to store an indication of at least one predetermined electronic authorization device configured to authorize each electronically-made request. The computerized authorization system is further configured such that: in response to receiving an electronically-made request to the electronic entity, an indication of the request is output to the at least one predetermined electronic authorization device configured to authorize the request as indicated in the store; and in response to receiving an indication of authorization from the at least one predetermined electronic authorization device, an indication of authorization of the request is output to the electronic entity.

28 Claims, 11 Drawing Sheets

(56) References Cited

U.S. PATENT DOCUMENTS

| | | | |
|---|---|---|---|
| 7,100,049 B2 | 8/2006 | Gasparini et al. | |
| 7,174,458 B2* | 2/2007 | Araki et al. | 713/168 |
| 7,231,044 B2 | 6/2007 | Dube | |
| 7,286,818 B2 | 10/2007 | Rosenberg | |
| 7,293,098 B2 | 11/2007 | Sandhu et al. | |
| 7,363,500 B2 | 4/2008 | Funk | |
| 7,437,554 B1 | 10/2008 | Arnold et al. | |
| 7,533,065 B2 | 5/2009 | Piikivi | |
| 7,748,028 B2* | 6/2010 | Sato et al. | 726/5 |
| 7,761,380 B2 | 7/2010 | Katz | |
| 7,804,982 B2* | 9/2010 | Howard et al. | 382/115 |
| 7,840,993 B2 | 11/2010 | Ganesan et al. | |
| 7,930,216 B2 | 4/2011 | Neofytides et al. | |
| 7,933,413 B2 | 4/2011 | Steeves et al. | |
| 7,979,894 B2 | 7/2011 | Royyuru et al. | |
| 8,019,365 B2 | 9/2011 | Fisher | |
| 8,024,229 B2 | 9/2011 | Baig et al. | |
| 8,041,343 B2* | 10/2011 | McLean | 455/414.1 |
| 8,042,155 B1 | 10/2011 | Chang et al. | |
| 8,055,587 B2 | 11/2011 | Delia et al. | |
| 2004/0104266 A1 | 6/2004 | Bolle et al. | |
| 2005/0097049 A1* | 5/2005 | Writer et al. | 705/44 |
| 2005/0172009 A1* | 8/2005 | Roh et al. | 709/219 |
| 2006/0021023 A1* | 1/2006 | Stewart et al. | 726/17 |
| 2006/0253389 A1* | 11/2006 | Hagale et al. | 705/39 |
| 2007/0192245 A1* | 8/2007 | Fisher et al. | 705/39 |
| 2007/0233573 A1* | 10/2007 | Wang et al. | 705/26 |
| 2007/0283143 A1* | 12/2007 | Yami et al. | 713/156 |
| 2008/0040787 A1* | 2/2008 | Aso et al. | 726/11 |
| 2009/0157518 A1* | 6/2009 | Bishop et al. | 705/19 |
| 2009/0233579 A1* | 9/2009 | Castell et al. | 455/411 |
| 2010/0031318 A1* | 2/2010 | Gardcia et al. | 726/3 |
| 2010/0145850 A1 | 6/2010 | Nagai et al. | |
| 2010/0325300 A1* | 12/2010 | Vasters et al. | 709/231 |
| 2011/0173448 A1* | 7/2011 | Baentsch et al. | 713/169 |
| 2011/0276489 A1 | 11/2011 | Larkin | |
| 2011/0319071 A1* | 12/2011 | Beppler et al. | 455/424 |
| 2013/0005368 A1* | 1/2013 | Hunziker | 455/466 |
| 2013/0024376 A1* | 1/2013 | Choudhuri et al. | 705/44 |

FOREIGN PATENT DOCUMENTS

| | | |
|---|---|---|
| EP | 2157540 | 2/2010 |
| GB | 2398159 A | 8/2004 |
| WO | WO-2007/101078 | 9/2007 |
| WO | WO-2010/067342 | 6/2010 |

OTHER PUBLICATIONS

Ying Qiu, Huafei Zhu, Somewhat Secure Mobile Electronic-voting Systems Based on the Cut-and-Choose Mechanism, Dec. 11-14, 2009, IEEE, vol. 1, pp. 1-5.*

Aboba, B., et al., "Extensible Authentication Protocol," Request for Comments (RFC) 3748, Internet Engineering Task Force, Jun. 2004.

Asokan, N., et al., "Man-in-the-Middle in Tunneled Authentication Protocols," Nov. 11, 2002, IACR ePrint Archive Report 2002/163.

Burrows, M., et al., "A Logic of Authentication," *ACM Transactions on Computer Systems*, Feb. 1990, vol. 8, No. 1, pp. 18-36.

Burrows, M., "Wide Mouthed Frog," Security Protocols Open Repository, http://www.lsv.ens-cachan.fr/Software/spore/wideMouthedFrog.html.

Chromium Project, "No TLS 1.2 (SHA-2) Support," Issue 90392, Jul. 25, 2011, http://code.google.com/p/chromium/issues/detail?id=90392.

Dhamija, R., et al., "The Battle Against Phishing: Dynamic Security Skins," Symposium on Usable Privacy and Security (SOUPS), Jul. 6-8, 2005, Pittsburgh, PA.

Dierks, T., et al., "The Transport Layer Security (TLS) Protocol: Version 1.2," Request for Comments (RFC) 5246, Internet Engineering Task Force, Aug. 2008.

Dusseault, L., et al., "PATCH Method for HTTP," Request for Comments (RFC) 5789, Internet Engineering Task Force, Mar. 2010.

Fielding, R.T., "Architectural Styles and the Design of Network-Based Software Architectures," University of California, Irvine, 2000.

Fielding, R.T, et al., "Hypertext Transfer Protocol—HTTP/1.1," Request for Comments (RFC) 2616, Internet Engineering Task Force, Jun. 1999.

Fielding, R.T., "REST APIs must be hypertext-driven," *Untangled: Musings of Roy T. Fielding*, Oct. 20, 2008, http://roy.gbiv.com/untangled/2008/rest-apis-must-be-hypertext-driven.

Fischer, V., et al., "Simple PLL-Based True Random Number Generator for Embedded Digital Systems," IEEE Workshop on Design and Diagnostics of Electronic Circuits and Systems, Stará Lesná, Slovakia, Apr. 18-21, 2004, pp. 129-136.

Goodin, D., "Hackers break SSL encryption used by millions of sites," *The Register*, Sep. 19, 2011, http://www.theregister.co.uk/2011/09/19/beast_exploits_paypal_ssl/.

Hacker News, "SSL broken. (TLS 1.0 cryptographic attack that works. Not just fake certs.)," Nov. 20, 2011, http://news.ycombinator.com/item?id=3015498.

Internet Assigned Numbers Authority (IANA), "Simple Authentication and Security Layer (SASL) Mechanisms," Mar. 19, 2012, http://wvvw.iana.orq/assignments/sasl-mechanisms.

Josefsson, S., "Using Kerberos Version 5 Over the Transport Layer Security (TLS) Protocol," Request for Comments (RFC) 6251, Internet Engineering Task Force, May 2011.

Melnikov, A., "Moving Digest-MD5 to Historic," Request for Comments (RFC) 6331, Internet Engineering Task Force, Jul. 2011.

Mennes, F., "Best Practices for Strong Authentication in Internet Banking," *Information Systems Security Association Journal*, Dec. 2007, pp. 6-10.

Messmer, E., "Authentication Services on Tap," *Network World*, Sep. 27, 2004, p. 35.

Netscape Corporation, "The SSL Protocol," Jun. 14, 1997, http://web.archive.org/web/19970614020952/http:/home.netscape.com/newsref/std/SSL.html.(originally at http://home.netscape.com/newsref/std/SSL.html).

Neuman, C., et al., "The Kerberos Network Authentication Service (V5)," Request for Comments (RFC) 4120, Internet Engineering Task Force, Jul. 2005.

Pettersen, Y.N., "10 years of SSL in Opera," *My Opera: Implementer's Notes*, Apr. 30, 2007.

Radwin, M.J., "A Challenge-Response Protocol with Digital Signatures," May 8, 1997, http://www.radwin.org/michael/projects/jnfs/paper/node32.html.

Raeburn, K., "Advanced Encryption Standard (AES) Encryption for Kerberos 5," Request for Comments (RFC) 3962, Internet Engineering Task Force, Feb. 2005.

Rescorla, E., et al., "The Secure HyperText Transfer Protocol," Request for Comments (RFC) 2660, Internet Engineering Task Force, Aug. 1999.

Rigney, C., et al., "Remote Authentication Dial in User Service (RADIUS)," Request for Comments (RFC) 2865, Internet Engineering Task Force, Jun. 2000.

Schneier, B., *Applied Cryptography*, $2^{nd}$ Ed., John Wiley and Sons, New York, 1996.

Simpson, W., "PPP Challenge Handshake Authentication Protocol (CHAP)," Request for Comments (RFC) 1994, Internet Engineering Task Force, Aug. 1996.

Stockel, A., "Securing Data and Financial Transactions," *Proceedings of the IEEE $29^{th}$ Annual Carnahan Conference on Security Technology*, Sanderstead, U.K., Oct. 18-20, 1995, pp. 397-401.

Turner, S., et al., "Prohibiting Secure Sockets Layer (SSL) Version 2.0," Request for Comments (RFC) 6176, Internet Engineering Task Force, Mar. 2011.

W3C/IETF URI Planning Interest Group, "URIs, URLs, and URNs: Clarifications and Recommendations 1.0," Sep. 21, 2001, http://www.w3.org/TR/uri-clarification/.

Zimmermann, P.R., *The Official PGP User's Guide*, MIT Press, 1995.

* cited by examiner

COMPUTERIZED AUTHORIZATION SYSTEM AND METHOD

CROSS REFERENCE TO RELATED APPLICATION

This application claims the benefit of U.S. application Ser. No. 13/426,467, filed Mar. 21, 2012, the disclosure of which is hereby incorporated by reference herein in its entirety, including any figures, tables, or drawings.

FIELD OF INVENTION

Embodiments of the present invention relate to a computerized authorization system and method. Specific embodiments relate in particular to a computerized authorization system and method used, for example, for computer network security, financial transactions, and parental control.

BACKGROUND OF INVENTION

A wide variety of systems are available for conducting electronic transactions in a more or less secure manner over a telecommunications link or the like.

One example is electronic payment by credit or debit card, for example. Commercial practices, for example, are swiftly undergoing a change towards completely electronic purchases and payment transactions. By using various payment terminals and debit or credit cards, payment transactions can be performed without handling hard cash at all.

When a user wishes to make a purchase in, for example, a retail store the card is swiped through a card reader, and information relating to the identity of the card, the identity of the retail store and the value of the goods or services being purchased is transmitted to a remote back-end computer network operated by the card issuer (such as a commercial bank or other financial institution). For further identification and security purposes, the card user may be issued with a personal identification number (PIN) and be required to enter his or her PIN into the card reader. The remote card processing system checks, for example, that the user's card account contains sufficient funds or credit to cover the proposed transaction, checks that the user's card account is currently operational and then, after enforcing all the proper verifications, issues a confirmation signal back to the card reader to indicate that the transaction may be authorized.

By providing an extra identification check by way of the PIN, this system helps to prevent fraud, but it is still not completely secure because the PIN may be intercepted together with card identification data when being transmitted between the reader and the remote server. If the thief is also able to obtain card identification details, for example from a discarded till receipt or through conspiracy with the store employee, it is a relatively simple matter to produce a fake card including all the appropriate identification information for later fraudulent use.

In another example, with the emergence and adoption of the Internet and related technologies, businesses are moving toward electronic integration of supply and financial chains.

To improve the confidentiality of communications and commerce over networks, public key infrastructure (PKI) encryption systems have been developed. Using PKI encryption, digital messages are encrypted and decrypted using ciphers or keys. PKI systems attempt to provide a high level of security because messages can be decoded only by persons having the recipient's private key. However, it is well known in the industry that a weakness of PKI technology is its susceptibility to the man-in-the-middle (MITM) attack.

A MITM attack is one in which a fraudster is able to read, insert and modify at will, messages between two parties without either party knowing that the communications path between them has been compromised. In order to implement the attack the attacker, which will typically comprise a software process rather than a person as such, must be able to observe and intercept messages going between the two 'victims'.

In order to avoid opportunities for interception, masquerading, MITM attacks, and other forms of electronic fraud, the industry had perceived a need for enhanced authentication of the identity of a person initiating an electronic transaction. In the prior art, a large number of attempts have been made to increase system security this way. The following is a list of prior art disclosures, by way of example, targeting this approach.

U.S. Pat. No. 5,754,657 describes a process by which a message source is authenticated by its location using GPS and appends a portion of that raw signal to the data.

U.S. Pat. No. 5,757,916 discloses a technique by which raw satellite signals from a source computer are transmitted to a remote server that requires authentication. A second source computer is employed that also sends its raw GPS signals to the server.

U.S. Pat. No. 7,043,635 discloses a coded identification system comprising an electronic computer and a specific communications device to generate a volatile identification code by applying a mask code to a pseudo-random string.

U.S. Pat. No. 7,231,044 discloses a digital authentication method using the delay between two timing signals emitted by the remote source of the transaction.

U.S. Pat. No. 7,933,413 describes a system with a channel variation component to facilitate a cryptographic key exchange between peer-to-peer devices in a secure way.

U.S. Pat. No. 8,055,587 discloses a method for constructing a secure transaction that requires a value of an originating Internet Protocol (IP) address be encrypted and combined with an account password accompanying authentication at a secure transaction web site.

In order to achieve its full potential, e-commerce must overcome numerous security and related issues, including concerns relating to hacker attacks, merchant impersonation, fraud, and transaction repudiation.

BRIEF SUMMARY

Embodiments of the present invention allow users or customers to exercise a more fine-grained control over the authorization of their transactions, independently and in addition to the typical verifications, for example, those conducted by a debit or credit card issuer.

Embodiments of the present invention increase the degree of security in online transactions by, for example, mitigating the effects of MITM attacks and other forms of electronic fraud.

This is achieved by the embodiments of the method and system described herein that intercept and authorize, in a collaborative manner, any sort of electronic activities conducted over a third party system enrolled in a centralized blocking alarm (CBA) program.

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

By way of example, in the computer system and computerized method described herein, the person or people who authorize an electronically-made request to an electronic entity such as a debit or credit card payment request to a bank, logging-on to a computer account such as an e-mail account, social networking account, or bank account must input authorization from a particular predetermined or particular electronic authorization device (such as a smartphone, computer (laptop or desktop), tablet computer or other suitable electronic device or mobile or portable electronic device). This is an additional security step. This arrangement puts responsibility on authorizing electronically-made requests to the person or people who can make the authorization. In this way, it is very clear to the person or people that a fraudulent electronic request has been made.

Continuing with this example, on an electronically-made request being made, the computerized authorization system receives the request. (The request may also be sent to the electronic entity such as computers at a bank, or computers at an internet service provider (ISP). However, then the request will automatically be paused or not carried out at the electronic entity until authorization is received.) The computerized authorization system then sends an indication of this request (in the form of an electronic signal over the Internet or other network, for example) to at least one predetermined electronic authorization device as indicated in a store (such as a hard disk drive or memory) of the computerized authorization system. That is to say, an electronic device to which the person or people who are authorized to authorize the request have ready-available access and which is, typically, identifiable to them, such as their own computer or smart phone. The authorization is by a particular or predetermined device. Once the authorization request is received at the electronic device, an alarm is typically initiated at the device. This may take the form of an audible and/or visual indication being made on the user-interface or display of the electronic authorization device. The owner or user of the electronic device may then enter authorization of the request or vote typically by entering numbers and/or letters, for example a PIN (a 5-digit PIN is used by way of example). Once the correct authorization has been entered an appropriate electronic signal is sent from the electronic authorization device to the computerized authorization system. On receipt of this electronic signal, the computerized authorization system sends an appropriate signal to the electronic entity (computers at a bank, or computers at an internet service provider (ISP), for example) and the request is carried out (either the paused request at the electronic entity is carried out or the request is sent to the electronic entity and then carried out).

Embodiments of the present invention include a method and system for temporarily blocking electronic activities and collecting further authorization before deciding whether to conduct or abort the original activities, the method includes: the requirements enforced on the third party service providers and the expected responses in their interaction with the disclosed technique; the characteristics of the activities involved in the present invention, being mandatory the capability to intercept them, since the disclosed method is not intended to notify of past events but to control potential not-yet-occurred actions; the specification of the requests to trigger an alarm, comprising, among others, the authorities to consult, the number of endorsements required and the time limit; the description of the voting mechanism and its inherent ability to detect and report fraud; two different ways to conduct the resolution delivery process; and the capacity to deal with ephemeral lacks of Internet access on the client side.

The example system is for alarm triggering, notification broadcasting, voting management and resolution delivery. The example system includes: one or more server devices (AT*S) (one or more electronic entities) in communication through a network with the third party service providers affiliated to the program (hereinafter "Sources"); one or more server devices (AV*S) (these form the computerized authorization system) in communication with client devices (the electronic authorization devices) over the Internet; the private network infrastructure to communicate AT*S devices with AV*S devices; wherein the electronic software comprises a series of instructions configured for: receiving an alarm triggering request (ATR) on a AT*S device from one of the Sources (an electronically-made request); passing onto the AV*S devices the pertinent section of the ATR received; transmitting informational messages via the Internet towards the client devices of the alarm recipients (hereinafter "Recipients"); collecting votes (indication of authorization) from the intended Recipients and sending their elections over the Internet to an AV*S device; wherein in response to receiving the minimum required number of votes to reach a verdict or after exhausting the period of time specified in the ATR, the system performs the following: updating the storage mediums accessed by the tracking services available to the Sources; and calling-back the triggering Source to inform about the resolution of the action.

In one embodiment of the present invention, a centralized alarm method is provided for temporarily blocking electronic activities and collecting further authorization before deciding whether to conduct or abort the original activities, the method comprising: receiving, from a reliable source, a description of an activity which is currently paused, waiting for the authorization of one or more users enrolled in the program; receiving, in addition, the minimum number of endorsements required from the intended recipients, a period of time delimiting the valid interval to cast a vote on the action, and the proper channels to communicate the final resolution back to the source; dispatching a notification of the alarm to each of the intended recipients and accepting their votes upon proper authentication of their identities; offering to the recipients the possibility to veto the action, as a technique to report and immediately abort a fraudulent activity; computing the votes supplied and determining the resolution of the poll, whether by reaching a verdict or by means of time exhaustion; informing the source about the authoritative decision on whether to proceed or to abort the current activity;

An auto-response mechanism may be provided to automatically cast a vote on behalf of a requested recipient according to certain rules, the configuration stated by the user in his or her profile and the characteristics of the current activity.

A tracking service may be provided to allow the sources of activities to query for status updates and resolution availability on their triggered alarms.

Default callback channels may be stored to notify the sources of the final decision when no channel is included in the triggering request.

In another embodiment of the present invention, a centralized blocking alarm system is provided to enhance control and authorization on any sort of electronic activities conducted over an affiliated third party system, the system comprising: one or more server modules (AT*S) in communication through a network with the third party service providers affiliated to the program; one or more server modules (AV*S) in communication with one or more client devices over the Internet; wherein the electronic software comprises a series of instructions configured for: receiving an alarm triggering request (ATR) on a AT*S module from one of the Sources; passing onto a AV*S module the pertinent section of the ATR received; transmitting informational messages via the Internet towards the client devices of the alarm recipients; collecting votes from the intended recipients and sending their elections over the Internet to a AV*S module; wherein in response to receiving the minimum required number of votes to reach a verdict or after exhausting the period of time specified in the ATR, a AT*S module informs the affiliated third party system of the resolution of the action.

The AT*S and AV*S modules may reside distributed in several server devices, further comprising the private network infrastructure and software to communicate AT*S devices with AV*S devices in a real-time manner.

The system may further comprise an auto-response module to automatically cast a vote on behalf of a requested recipient.

The system may further comprise a rule evaluation engine to allow more complex auto-vote settings per recipient, according to the service provider that triggered the alarm, the kind of activity involved, the date and time, among other criteria.

The system may further comprise a tracking service for allowing service providers to poll for status updates and resolution availability on their triggered alarms.

The client device (predetermined electronic authorization device) may be a cell phone, a tablet, a personal computer, or any other kind of Internet connection capable device, whether a commercial general-purpose device or a specialized piece of hardware.

In an aspect of specific embodiments of the present invention, there is provided a computerized authorization system configured to authorize electronically-made requests to an electronic entity, the computerized authorization system comprising: a store configured to store an indication of at least one predetermined electronic authorization device configured to authorize each electronically-made request; the computerized authorization system being further configured such that: in response to receiving an electronically-made request to the electronic entity, an indication of the request is output to the at least one predetermined electronic authorization device configured to authorize the request as indicated in the store; and in response to receiving an indication of authorization from the at least one predetermined electronic authorization device, an indication of authorization of the request is output to the electronic entity.

The computerized authorization system may be further configured such that if an indication of authorization of the request is not received from the at least one predetermined electronic authorization device within a predetermined time an indication that the request is rejected is sent to the electronic entity.

The computerized authorization system may be further configured to receive an indication from the at least one predetermined electronic authorization device that the electronically-made request is fraudulent.

The computerized authorization system may be further configured such that, in response to receiving the indication from the at least one predetermined electronic authorization device that the electronically-made request is fraudulent, an identity request is made to identify the electronic device that made the electronically-made request and/or a user of the electronic device.

The identity request may comprise a signal being sent to the electronic device that made the electronically-made request, to capture an image of a user of the electronic device.

The at least one predetermined electronic authorization device may be a different device to an electronic device that makes the electronically-made request.

The computerized authorization system may be configured to send the indication of the electronically-made request to the electronic entity to a plurality of predetermined electronic authorization devices configured to authorize the request.

The indication of authorization may be sent to the electronic entity in response to receiving an indication of the authorization from a predetermined number of a plurality of predetermined electronic authorization devices.

The store may be configured to store the predetermined number of the plurality of predetermined electronic authorization devices.

The computerized authorization system may be further configured to automatically send an indication of authorization of the request to the electronic entity if at least one predetermined criteria are met.

A store may be configured to store the at least one predetermined criteria.

The at least one predetermined criteria may be set by the at least one predetermined electronic authorization device.

The computerized authorization system may comprise a plurality of computers and/or servers on a network.

In another aspect of specific embodiments of the present invention, there is provided a computerized authorization method, the computerized authorization method comprising: in response to receiving an electronically-made request to an electronic entity, sending an indication of the request to at least one predetermined electronic authorization device as indicated in a store; and in response to receiving an indication of the authorization from the at least one predetermined electronic authorization device as indicated in the store, sending an indication of authorization of the request to the electronic entity.

The computerized authorization method may further comprise sending an indication that the request is rejected to the electronic entity if an indication of authorization of the request is not received from the at least one predetermined electronic authorization device within a predetermined time.

The computerized authorization method may further comprise receiving an indication from the at least one predetermined electronic authorization device that the electronically made request is fraudulent.

The computerized authorization method may further comprise in response to receiving the indication from the at least one predetermined electronic authorization device that the electronically-made request is fraudulent, making an identity request to identify the electronic device that made the electronically-made request and/or a user of the electronic device.

The identity request may comprise sending a signal to the electronic device that made the electronically made request, to capture an image of a user of the electronic device.

The at least one predetermined electronic authorization device may be a different device to a device that makes the electronically-made request.

The computerized authorization method may comprise outputting the indication of the electronically-made request to the electronic entity to a plurality of predetermined electronic authorization devices configured to authorize the request.

The computerized authorization method may comprise sending the indication of authorization to the electronic entity in response to receiving an indication of the authorization from a predetermined number of the plurality of predetermined electronic authorization devices.

The computerized authorization method may comprise storing the predetermined number of the plurality of predetermined electronic authorization devices in the store.

The computerized authorization method may further comprise automatically sending an indication of authorization of the request to the electronic entity if at least one predetermined criteria are met.

The computerized authorization method may further comprise storing the at least one predetermined criteria in a store.

The at least one predetermined electronic authorization device may be set the at least one predetermined criteria.

The computerized authorization method may be carried out by a plurality of computers and/or servers on a network.

In a further aspect of specific embodiments of the present invention, there is provided an electronic authorization device, the electronic authorization device comprising: an input to receive, from a computerized authorization system, an indication of an electronically-made request to an electronic entity from a different electronic device; a user interface configured to indicate the indication of the electronically-made request and to allow a user to authorize the request; and an output to output an indication of authorization of the request to the computerized authorization system; the electronic authorization device being configured such that: in response to receiving the indication of the electronically-made request at the input, the user interface indicates the electronically-made request; and in response to a user authorizing the request, outputting from the output an indication of authorization of the request to the computerized authorization system.

In a yet further aspect of specific embodiments of the present invention, there is provided a computer-readable medium containing a set of instructions to cause a computer to perform a method comprising: in response to receiving an electronically made request to an electronic entity, sending an indication of the request to at least one predetermined electronic authorization device as indicated in a store; and in response to receiving an indication of the authorization from the at least one predetermined electronic authorization device as indicated in the store, sending an indication of authorization of the request to the electronic entity.

BRIEF DESCRIPTION OF DRAWINGS

The invention will be described in more detail, by way of example, with reference to the accompanying drawings, in which.

DETAILED DISCLOSURE

Various detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a representative basis for teaching one skilled in the art to employ the present invention in a variety of manners.

The word "exemplary" is used herein to mean serving as an example, instance, or illustration. Any aspect or design described herein as "exemplary" is not necessarily to be construed as preferred or advantageous over other aspects or designs.

As used in this application, the terms "component", "module", "system", and the like are intended to refer to a computer-related entity, either hardware, a combination of hardware and software, software, or software in execution.

In some cases, well-known structures, techniques, or operations are not shown or described in detail in order to avoid obscuring aspects of specific embodiments of the invention. Furthermore, the described features, structures, or characteristics may be combined in any suitable manner in one or more embodiments.

Figure 1:
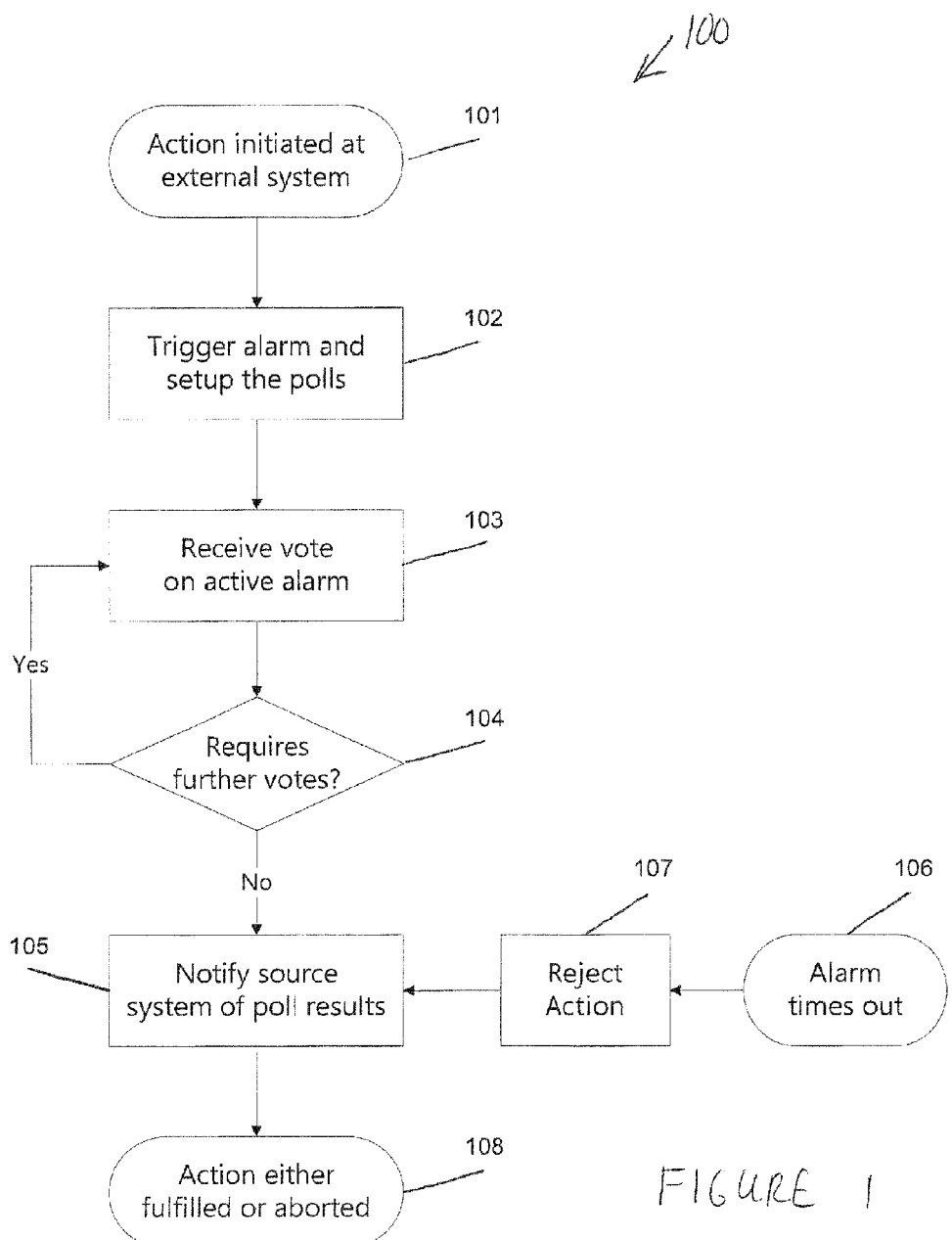
FIG. 1 is a flowchart illustrating the blocking alarm high-level behavior according to embodiments of the invention.

Referring initially to FIG. 1, illustrated is the blocking alarm high-level behavior, according to embodiments of the invention, in the form of a flowchart 100. At step 101 of the flowchart an action is initiated at an external system enrolled in the centralized blocking alarm (CBA) program. In other words, an electronically-made request is made by an electronic device to an electronic entity. If, as stated by the configuration settings on the third party system, the action demands further authorization, the client CBA software (computerized authorization system) triggers an alarm and a poll is set up to decide on the pertinence of the action 102. In other words, an indication of the request is sent to predetermined electronic authorization devices as indicated in a store (hard disk drive or memory, for example) of the CBA or computerized authorization system.

Subsequently, when one of the intended recipients (predetermined authorization devices) emits a vote on the issue 103 (sends an indication of authorization of the request, typically by entering a PIN into the authorization device), the CBA system analyzes the poll results. In the event the minimum number of endorsements or authorizations required is not yet reached though still feasible (decision block 104 is "Yes"), the enquiry is kept active and in pending resolution status. Otherwise, when the activity requires no further votes to be solved (decision block 104 is "No"), the associated poll is closed and the result of the scrutiny is notified back to the source system 105 (electronic entity to whom the request was made).

Concurrently, a CBA or computerized authorization system component monitors the life span of the alarm. If the timeout period or life span elapsed prior to completion of the operation 106, the system signals a rejection on an interval exhaustion basis 107; which is, consequently, notified to the originator 105 (electronic entity to whom the request was made).

Continuing with the flowchart of FIG. 1, once a client CBA module on a third party system receives an authorization response from the CBA server (all forming the computerized authorization system), the affiliated system (electronic entity) would act accordingly to either fulfill or abort the activity (electronically-made request) which triggered off the alarm 108.

Figure 2:
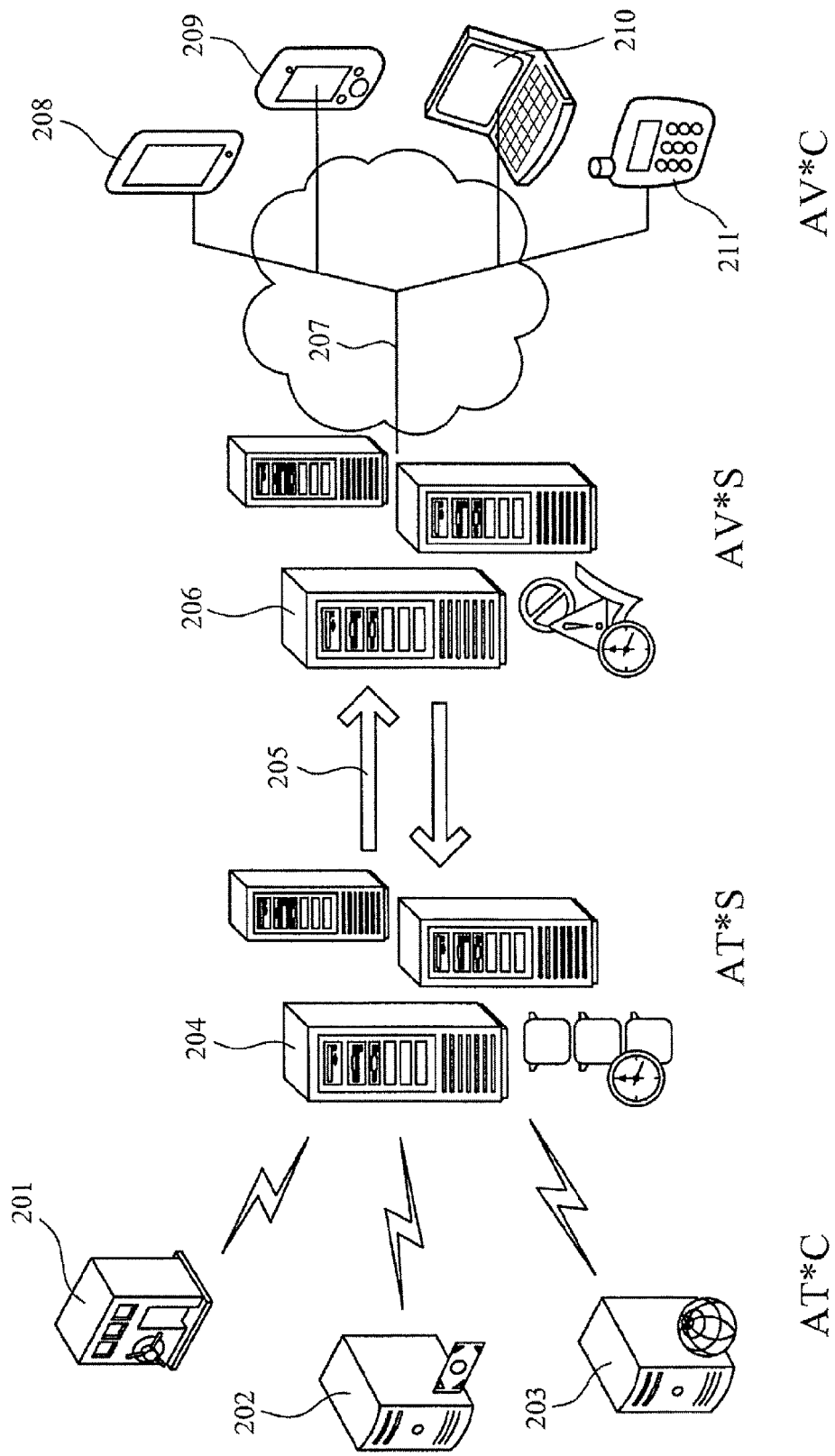
FIG. 2 illustrates a schematic block diagram of an exemplary computing environment operable to execute disclosed embodiments of the invention.

FIG. 2 illustrates a schematic block diagram of an exemplary computing environment operable to execute the disclosed embodiments. The service providers enrolled in the CBA program house alarm triggering clients (AT*C) 201, 202, 203 (electronic entities, such as computers or severs providing banking services, or computers or servers providing other internet services such as e-mail or social networking)) to interact with the server side components 204 (part of the computerized authorization system) made available to them. Embodiments of the invention are equally effective in scenarios in which the service provider is a commercial bank or other financial institution 201, as well as an electronic commerce website 202 or any sort of business 203 demanding complementary authorization over a secure channel of the activities performed by its clients.

The AT*C (electronic entities) may be implemented in software, firmware, hardware or some combination thereof. In one embodiment, the AT*C communicates with the alarm triggering services (AT*S) 204 over HTTPS, sending requests, properly signed with the provider credentials, to the web services depicted in the application programming interface (API) or RESTful API of the system. In alternative embodiments, as will be appreciated by those skilled in the art, a number of other network protocols, and/or AT*S API implementations are capable of facilitating communications between the various third party providers and the system.

Still referring to FIG. 2, the AT*S modules 204 are responsible for all the interaction with the service providers enrolled in the CBA program. In a preferred embodiment, an isolated farm of server devices houses the AT*S modules 204, accessible only to affiliated systems via private URLs assigned to each of them, with further restrictions enforced through IP-range firewall rules and/or controlled access over a TCP/IP compliant virtual private network (VPN).

The AT*S 204 cooperates with the server modules in charge of resolving the authoritative response on the triggered action: the alarm voting services (AV*S) 206 (another part of the computerized authorization system). In a distributed environment, the AT*S communicates with the AV*S server devices via a remote messaging platform over a variety of supported network protocols 205. In an alternative single-server embodiment (of the computerized authorization system), the triggering and voting services interact over some sort of interprocess communication (IPC); or even, in a monolithic approach, the logical AT*S and AV*S components may share the same physical process space.

Continuing with the diagram of FIG. 2, the AV*S modules 206 inform the alarm recipients or recipients devices (electronic authorization devices) over the Internet, or a telephone network, or any other similar communication network 207. The recipients devices house alarm voting clients (AV*C) 208, 209, 210, 211 capable of receiving, decrypting and displaying the alarm notification (electronically-made request) to the final users, as well as collecting and transmitting their votes (sending an indication of authorization) in a secure manner back to the AV*S 206. The client device housing the AV*C may either be a tablet 208, a cell phone 209, a personal computer 210, or any other kind of connection capable device 211, whether a commercial general-purpose device or a specialized piece of hardware.

The AV*C may be implemented in software, firmware, hardware or some combination thereof. In one embodiment, the AV*C communicate with the alarm voting services (AV*S) 206 over an application layer protocol on the TCP/IP stack (HTTP or the like), in conjunction with Secure Sockets Layer (SSL)/Transport Layer Security (TLS) protocols to provide mutual authentication of the parties involved. In a preferred implementation, the AV*C are deployed on native applications for Windows, iOS, Android or any other operating system, instead of a browser-based thin-client approach, to guarantee that the AV*S certificate message provides a valid certificate chain, leading to an acceptable certificate authority (CA) according to the public key infrastructure (PKI) of the system.

Figure 3:
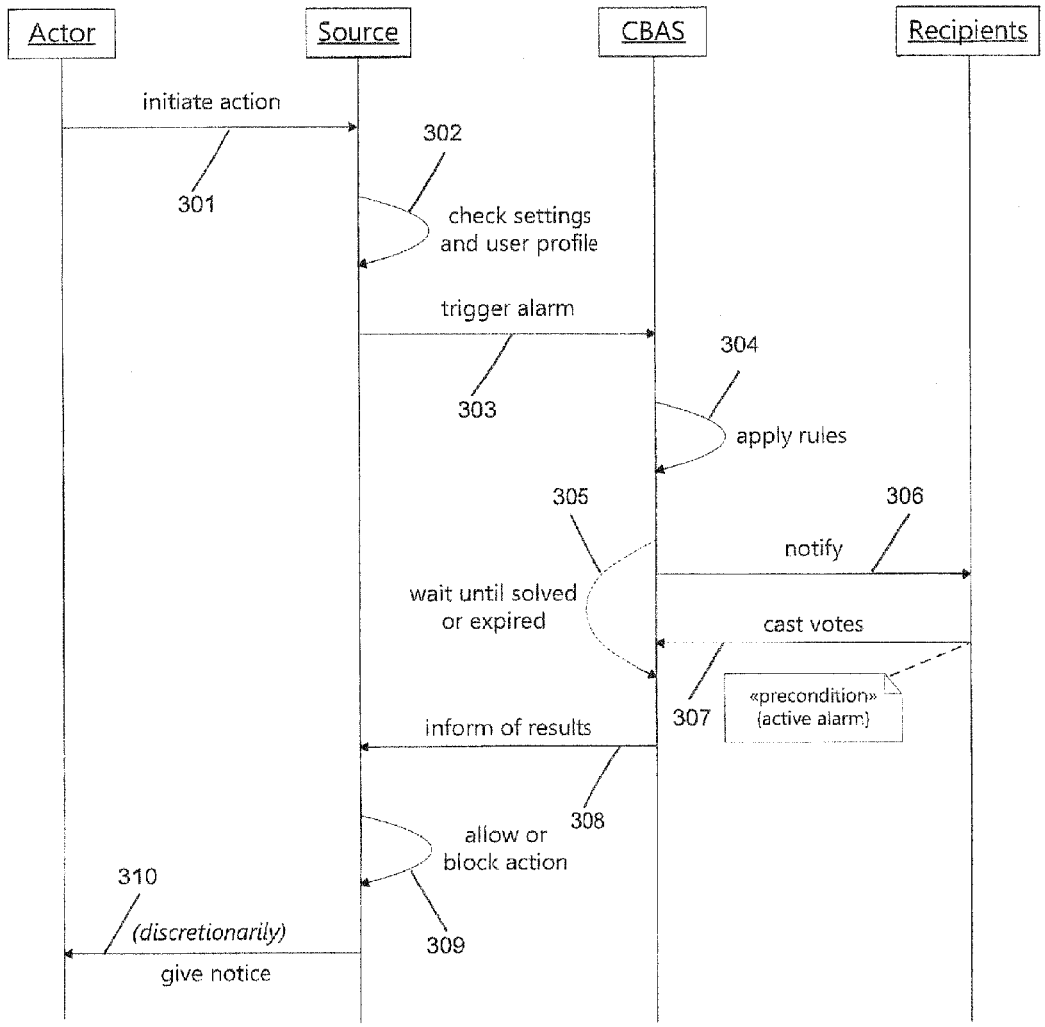
FIG. 3 illustrates an exemplary sequence analysis of blocking alarms in accordance with disclosed embodiments of the invention.

FIG. 3 illustrates an exemplary sequence analysis of blocking alarms in accordance with specific embodiments. The process begins when a user ("Actor") initiates an action 301 or electronically makes a request to or in a third party system ("Source") or electronic entity enrolled in the centralized blocking alarm (CBA) program (uses the computerized authorization system).

At step 302, the "Source" determines, according to its business rules and configuration settings, whether the action demands further authorization (from the computerized authorization system); as well as if the "Actor" supports complementary approval of the activity via the CBA system, as indicated by his or her account profile.

In the event the CBA system (CBAS) intervention is required, the "Source" temporarily suspends the execution of the current activity and triggers an alarm 303 in the CBAS. The alarm triggering request (ATR) may include, but is not limited to, the "Actor" identity information, the "Source" CBA affiliate identifier, the code and/or name of the action that triggered the alarm, a detailed description of the action, the CBA identifiers of the voting authorities ("Recipients" or predetermined electronic authorization devices, the identities or identifiers of which are stored in a store of the CBAS), the minimum number of endorsements required and a timeout interval for the poll. Additionally, the ATR may include callback specifications to inform the "Source" about the operation progress or of its final resolution, as well as a stock-keeping unit (SKU) attached to the operation by the "Source" for tracking or reporting purposes.

Continuing with the diagram of FIG. 3, the CBAS, upon reception of the request, applies the auto-vote rules 304 relevant to the ATR, according to the configuration stated by the "Recipients" in their profiles. Concurrently, an active component, running under its own thread of execution, monitors alarms 305 to signal and close those where the timeout period has elapsed before receiving enough votes to reach a verdict, typically due to inaccessible or unconcerned voting authorities.

At step 306, the CBAS notifies the "Recipients" of the alarm by sending them request for vote (RFV) messages (sending an indication of the electronically-made request). The CBAS assembles the RFV out of the information in the ATR combined with the "Source" data in the repository of affiliated service providers. The RFV may include, but is not limited to, an alarm identifier internal to the system, the "Actor" and "Source" identity information, a human-readable name of the action that triggered the alarm, a detailed description of the action, the date and time when the alarm was triggered, and the closing/expiry date and time of the voting request.

The "Recipients" cast their votes 307 endorsing (authorizing), objecting or vetoing the activity under consideration (typically, endorsing, by entering a PIN on their user-interface and objecting or vetoing by selecting appropriate buttons). The CBAS enforces, as a precondition to concede the right to vote, that the poll is still active: unresolved, according to the minimum number of endorsements stated in the ATR; and unexpired, in accordance with the triggering date and the timeout interval specified. In a preferred embodiment, voting or sensitive voting (i.e. endorsement) demands from the recipient further authentication, requesting the input of a shared secret, such as a personal identification number (PIN) or a one-time password (OTP).

Still referring to FIG. 3, once a verdict has been reached or the alarm has expired, the CBAS informs the "Source" (electronic entity) of the results 308, which would act accordingly to either allow or block the action 309, so far temporarily suspended. The "Source" discretionarily informs the "Actor" 310 (electronic device that makes an electronic request) of the authorization resolution.

Figure 4:
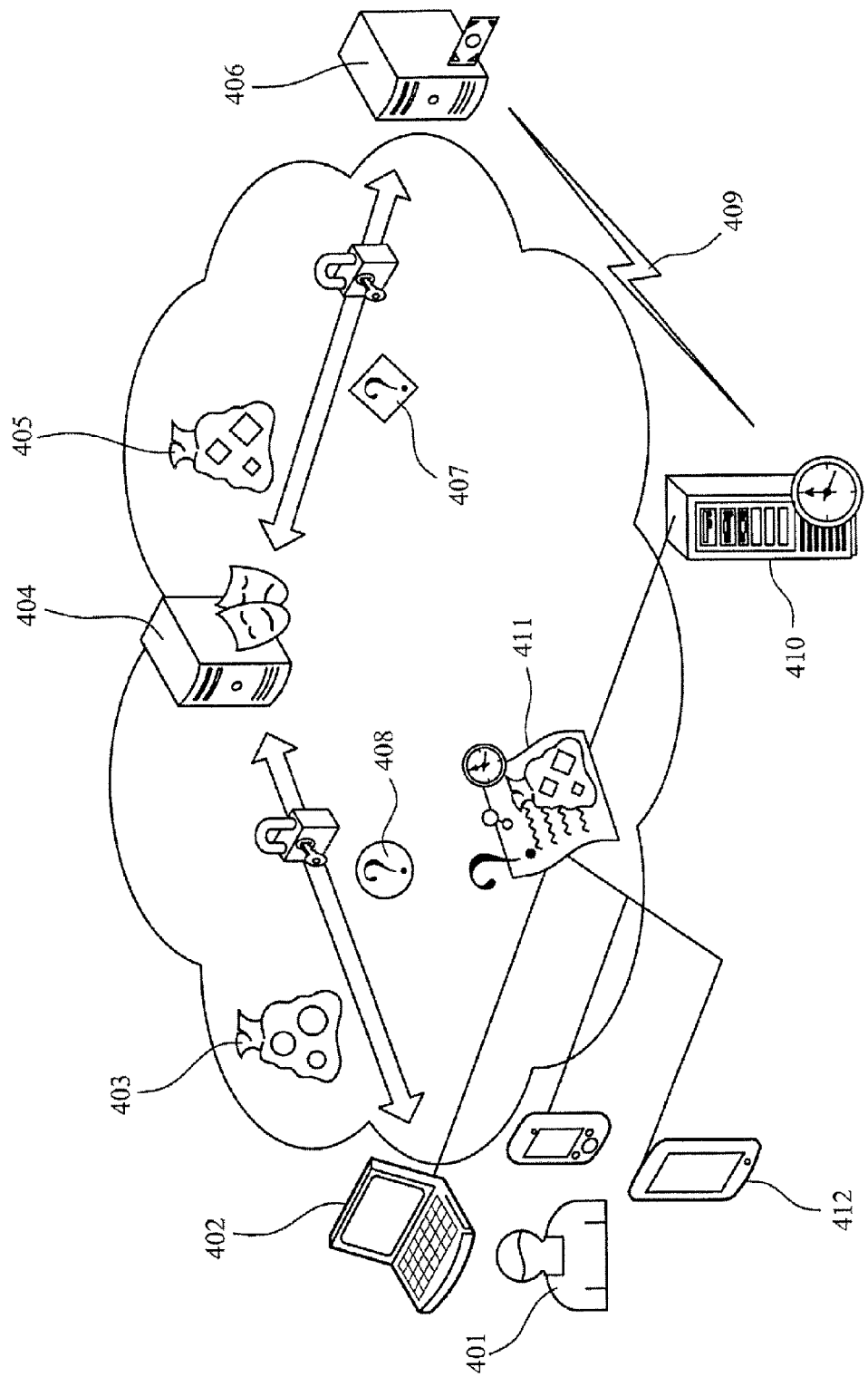
FIG. 4 is a diagram illustrating the measures for defeating the man in the middle scheme according to embodiments of the invention.

FIG. 4 is a diagram illustrating the measures for defeating a man in the middle scheme according to specific embodiments of the invention. The diagram conceptually demonstrates an attack that can be carry out on an unsuspecting user 401, who wishes to connect to a sensitive network site, herein exemplified by the service provider 406 (electronic entity), with which the customer 401 has an account. However, instead of directly entering the URL into a personal computer 402, user 401 clicks, for instance, on a link received on an e-mail message, which the user believes to have come from the service provider 406 because indicia appearing in the message conveys the impression that this is the case. Unfortunately though, the e-mail is a forgery sent out by an attacker for fraudulently routing the user's network connection through an anonymous proxy server 404.

It will appreciated by those skilled in the art that the method described, widely known as phishing, is only one way in which a man-in-the-middle (MITM) attack can be perpetrated. Many variants or similar attacks are possible, for example: placing Trojan code on a customer PC, corrupting a user host file, keylogging, setting up a rogue Wi-Fi access point or gaining access to a Domain Name Server (DNS), among others.

Returning to the discussion of FIG. 4, if the attacker has obtained a legitimate certificate for proxy server 404, and thereby opens an SSL session over secure channel, the user 401 experience is perfectly normal, thereby confirming the user's falsified confidence in the legitimacy of the operations conducted by the service provider 406.

As indicated by 403, the customer 401 submits the request supposedly to server 406 (the service provider or electronic entity). The man-in-the-middle (MITM) 404 intercepts the request, modifies the request by substituting fraudulent data in place of the genuine details (gray circles 403 to black diamonds 405), and forwards on the modified request 405 to the service provider 406.

In step 407, the service provider 406 issues a transaction confirmation message to the customer, which is intercepted by the MITM process 404 and relayed to the customer in step 408. Again, if the payload includes a copy of the transaction details, the MITM 404 substitutes back in the original customer transaction details (gray circle in 408 instead of black diamond in 407), so that the customer 401 remains unaware of the true transaction that is going to occur.

The aforementioned MITM attack is exceptionally complex to notice until a later statement is received by the user. Additionally, since the service provider records show that a genuine customer logged in and requested an action that was validated, it may be difficult for a customer to prove that they were not party to the fraudulent transaction that occurred.

However, still referring to FIG. 4, as the service provider 406 enrolled in the CBA program embodying the present invention, it temporarily suspends the transaction altered by the MITM 404, while triggering a blocking alarm 409 to request further authorization from user 401 before allowing the action to proceed.

The centralized blocking alarm system (CBAS) 410 issues a request for vote (RFV) notification 411 containing the fraudulent data injected by the MITM (black diamonds at 411). The customer 401 receives the RFV over a secure network channel, to a predetermined electronic authorization device either personal computer 402 where the action was initiated, or in a separate hardware device 412 (such as a cell phone or smart phone); being able to perceive the threat and abort the transaction. Hence, the CBAS 410 offers user 401 the possibility to detect, block and report the MITM 404 attack.

Figure 5:
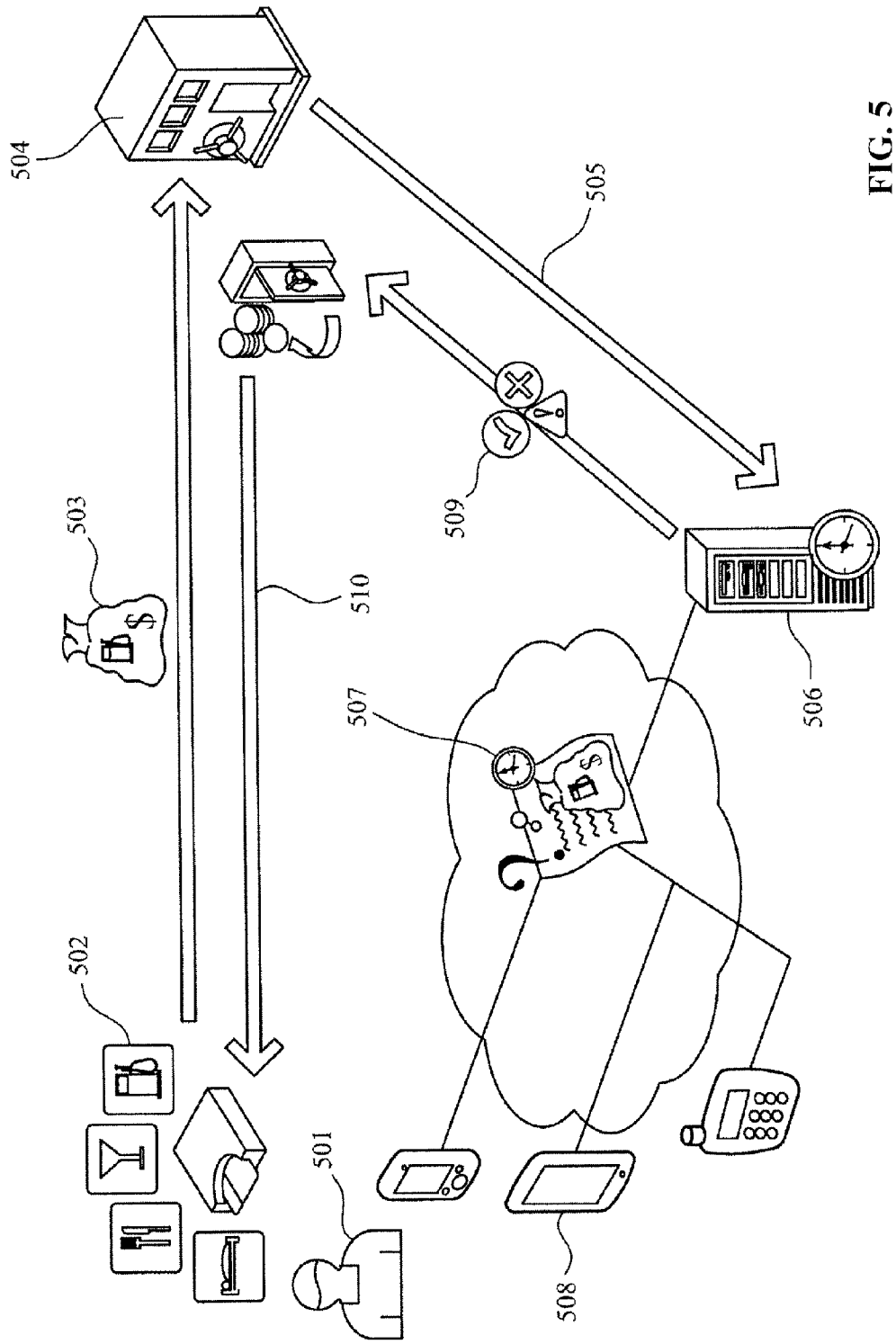
FIG. 5 is a diagram illustrating a method to exercise a more fine-grained control over the authorization of financial transactions according to embodiments of the invention.

FIG. 5 is a diagram illustrating a method to exercise a more fine-grained control over the authorization of financial transactions. At the first step the cardholder 501 initiates a credit or debit card transaction in, for example, a petrol station 502. When the card is swiped through the card reader, the identity of the point-of-sale and the value of the goods or services being purchased is transmitted 503 to the back-end computer network operated by the card issuer 504 (electronic entity).

In this example, the cardholder is enrolled in the financial institution centralized blocking alarm (CBA) program, and thus the card issuer 504 temporarily blocks the transaction and the CBA client software running in the financial institution network submits an alarm triggering request (ATR) associated to the current operation. The ATR is typically an encrypted XML string sent over a private secure channel 505 allocated to each of the subscribed service providers.

The CBA system 506 assembles request for vote (RFV) messages 507 addressed to the proper recipients, according to the ATR received and related settings established by the service provider and the users involved. In the exemplary embodiment, authorization is requested only from the cardholder 501 (an indication of the request is only sent to the cardholder's predetermined electronic authorization device), who receives the RFV and responds accordingly by means of the predetermined electronic authorization device, such as a cell phone, a tablet, a specialized piece of hardware or any other sort of connection capable client device 508. The client component (electronic authorization device) 508 is preferably connected to the server (CBA system or computerized authorization system 506) by data transmission link, such as the Internet; though non-Internet based voting may be handled, such as by telephone, through the touchtone keypad of the phone, or by responding orally wherein the system utilizes voice recognition software (IVR).

Figure 12:
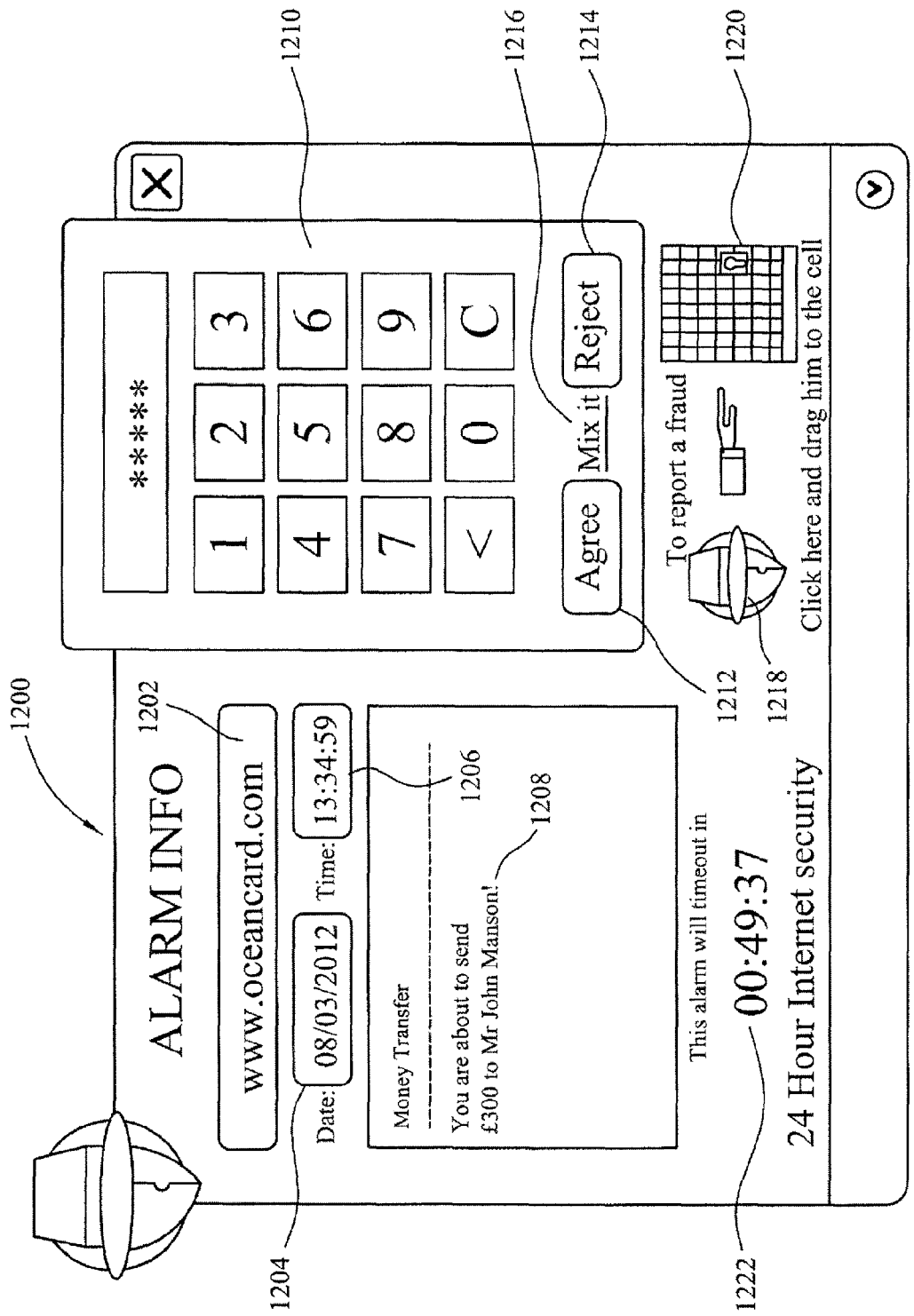
FIG. 12 illustrates a screen display of an electronic authorization device embodying an aspect of specific embodiments of the present invention.

The cardholder 501 examines, in his or her client device 508, the transaction information comprised in the RFV 507. An example illustration of the display or user interface 1200 of the client device is in FIG. 12. The display or user interface is configured to indicate or display the indication of an electronically-made request. In this example, the request includes the electronic entity or financial institution to whom the request is made 1202 (in this example, www.oceancard.com), the date 1204 (in this example, Aug. 3, 2012) and time 1206 (in this example, in the format of hours:minutes:seconds, in the example case, 13:34:59), and details of the request 1208 (in this example, a transfer of £300 to Mr. John Manson). The user interface also allows a user to authorize the request or vote for it. The user interface includes a keypad display 1210 and the user authorizes the request or votes for it by entering their personal identification number (PIN) on the numerals 0 to 9 on the keypad. In this example, a 5-digit PIN is required. Once a user's PIN has been entered, the request is authorized by selecting "Agree" button 1212 in the user interface. The user interface includes a "Reject" button 1214. If the user wishes to reject the request (for example, because it is erroneous rather than fraudulent), selecting the "Reject" button sends an appropriate signal to the electronic entity to whom the request is made. The user interface includes a "Mix it" button 1216 (in this example, between the "Agree" and "Reject" buttons). Selecting the "Mix it" button causes the numerals 0 to 9 indicated on the keypad to be randomly or pseudo-randomly displayed on the keys of the keypad. This is an extra security feature.

The user interface 1200 includes an arrangement to report that the electronically made request is fraudulent. In order for a user to report a fraudulent request, in this example, in the user interface an image 1218 is dragged onto an image of a cell 1220 by the user. As a result, an indication of fraudulent activity is sent or transmitted to the electronic entity. In response to receiving the indication from the at least one predetermined electronic authorization device that the electronically made request is fraudulent, an identity request is made by the electronic entity to identify the electronic device that made the electronically made request and/or a user of the electronic device. In this example, the identity request comprises a signal being sent to the electronic device that made the electronically made request, to capture an image of a user of the electronic device. For example, to command a camera on the electronic device to take a picture of the user.

In this example, if an indication of authorization of the request is not received from the predetermined electronic authorization device or client device within a predetermined time the request is automatically rejected. The time remaining 1222 of the predetermined time is shown in the user interface 1200, in this example, in the format minutes:seconds:hundredths of seconds and, in this example, 0 minutes, 49 seconds and 37 hundredths of seconds remain.

Returning to FIG. 5, if the user 501 emits a vote on the action or after the period of time specified in the ATR 505 is exhausted, the CBA system informs the card issuer 504 of the decision 509. Upon receipt of the authorization response, the financial institution issues a signal 510 back to the card reader to indicate whether the transaction is allowed to proceed or not.

Figure 6:
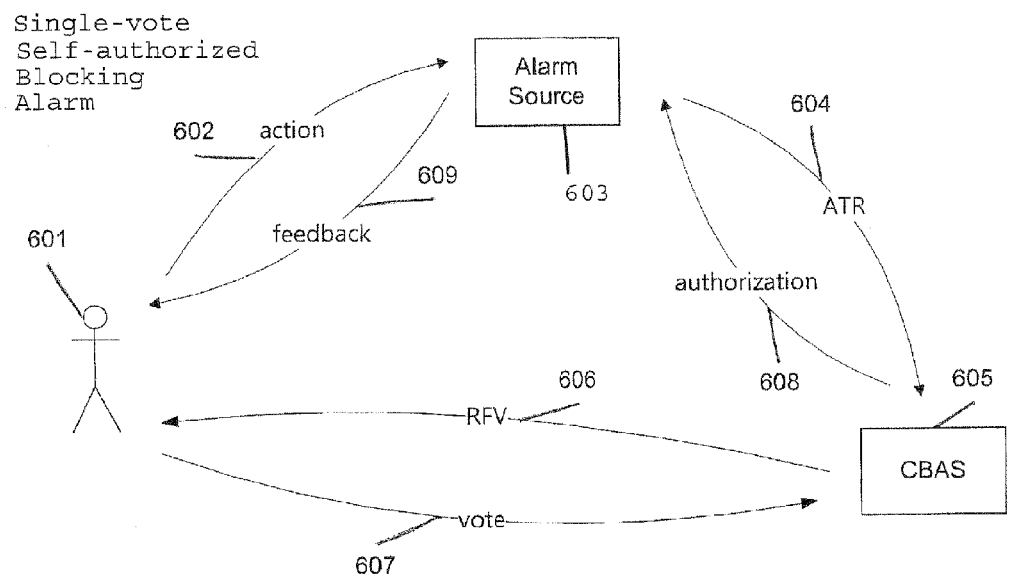
FIG. 6 illustrates a visual representation of a single-vote self-authorized blocking alarm according to embodiments of the invention.

FIG. 6 illustrates a visual representation of a single-vote self-authorized blocking alarm, a scenario similar to the one depicted in FIG. 5. The user 601 initiates an action 602 in a service provider 603 (electronic entity) that transmits an ATR 604 to the CBAS 605 (computerized authorization system), which in turn sends a single RFV 606 to the same user 601 who invoked the initial action. In this scenario only one vote 607 influences the authorization 608 of the activity, and the user receives feedback 609 about a decision taken by herself on the CBAS.

Figure 7:
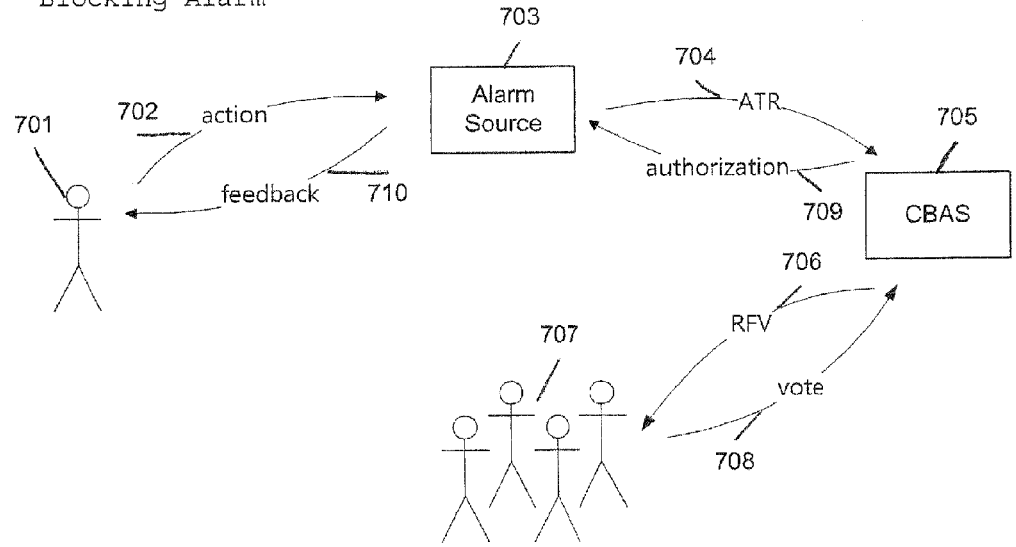
FIG. 7 illustrates a visual representation of a multi-vote supervised blocking alarm according to embodiments of the invention.

In contrast, FIG. 7 illustrates a visual representation of a multi-vote supervised blocking alarm. The same as in the previous diagram, the user 701 initiates an action 702 in a service provider 703 (electronic entity) that transmits an ATR 704 to the CBAS 705 (computerized authorization system). However, in this scenario there are multiple voting authorities 707 stated in the ATR 704, none of them being user 701.

The CBAS 705 sends an RFV 706 to each of the intended recipients 707 and collects their votes 708 on the alarm. Upon reaching a verdict, the CBAS transmits the results 709 to the source system 703, which in turn sends a notice 710 to user 701. In this scenario the collective decision 709 achieved by the voting authorities 707 depicts a technique to enforce regulatory supervision on the user 701 activities in accordance with embodiments of the invention. It is up to the ATR to state the minimum number of endorsements (predetermined number of authorizations from a predetermined number of electronic authorization devices) required to authorize the action; for instance, at least one, or a majority, or all of the recipients (predetermined electronic authorization devices).

Figure 8:
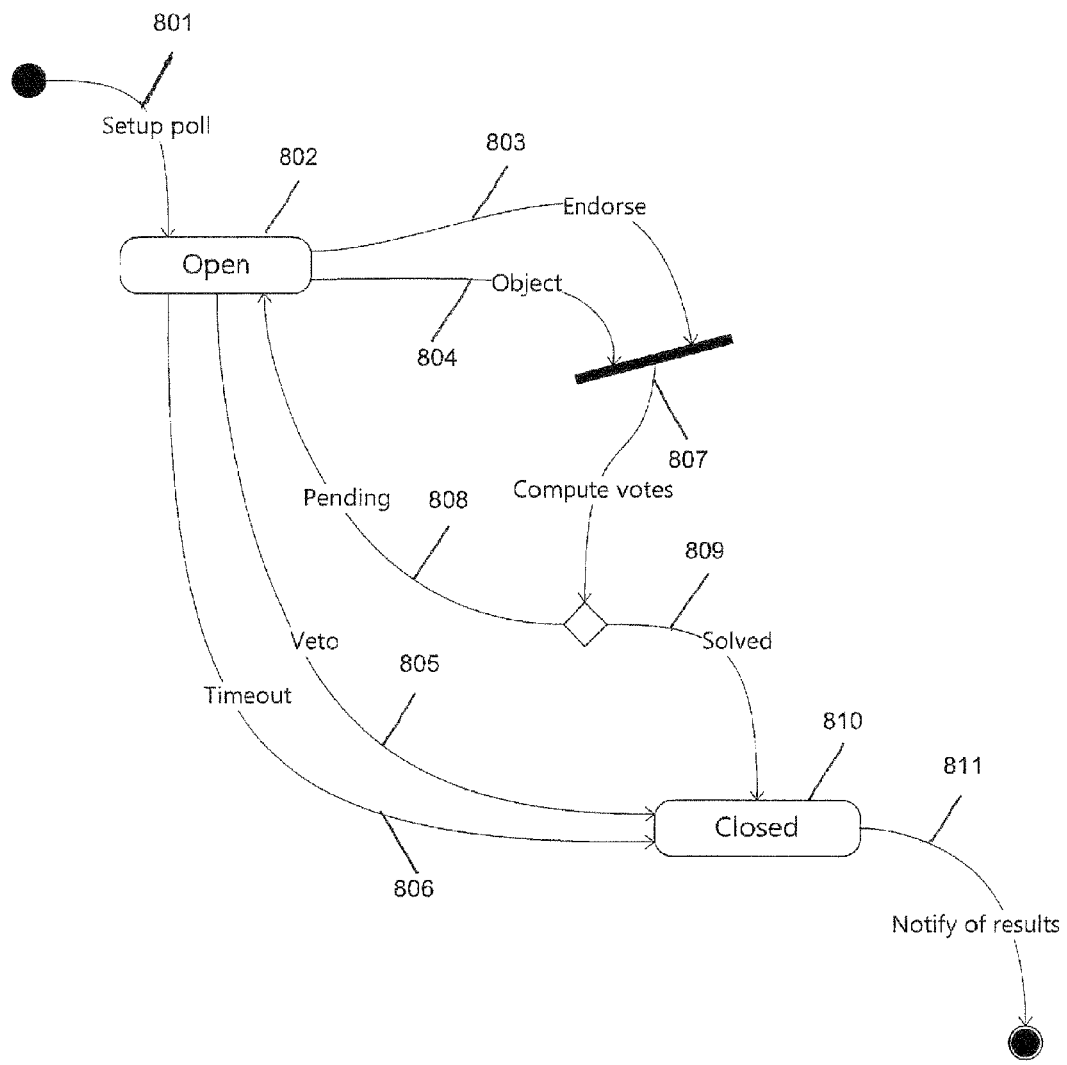
FIG. 8 is a state chart illustrating the voting mechanism behavior according to embodiments of the invention.

FIG. 8 is a state chart illustrating the voting mechanism behavior according to specific embodiments of the invention. At step 801, upon reception of an alarm triggering request (ATR) (electronically-made request), a poll is setup in the system to conduct the authorization survey. Initially the poll is in an open state 802 and accepting votes from the recipients of the alarm.

If a voting authority either endorses 803 (accepts) or objects 804 the request, the system computes 807 the votes cast so far to decide whether the poll is still pending 808 and remains open 802, or has already been solved 809 and should be closed 810. An alarm is regarded as pending when the minimum number of endorsements required is not yet reached though still feasible. Otherwise, the alarm is regarded as solved, either by acceptance (required endorsements reached) or by rejection (requirements no longer attainable).

Continuing with the diagram of FIG. 8, a recipient may veto 805 the request. A veto, in accordance with the disclosed invention, is a technique to report and immediately abort fraudulent activities. While an objection 804 is a plain disagreement statement, subject to be outweighed by the votes of the other recipients; a veto unilaterally bans the request, closes the poll 810 and transmits a warning message to the service provider enrolled in the CBA program, Finally, the poll associated to the request may pass from an open 802 to a closed 810 state when a timeout 806 is signaled by the alarm life span monitor, according to the interval specified in the ATR. Once the voting mechanism ends, the source system is notified of the process results 811.

Figure 9:
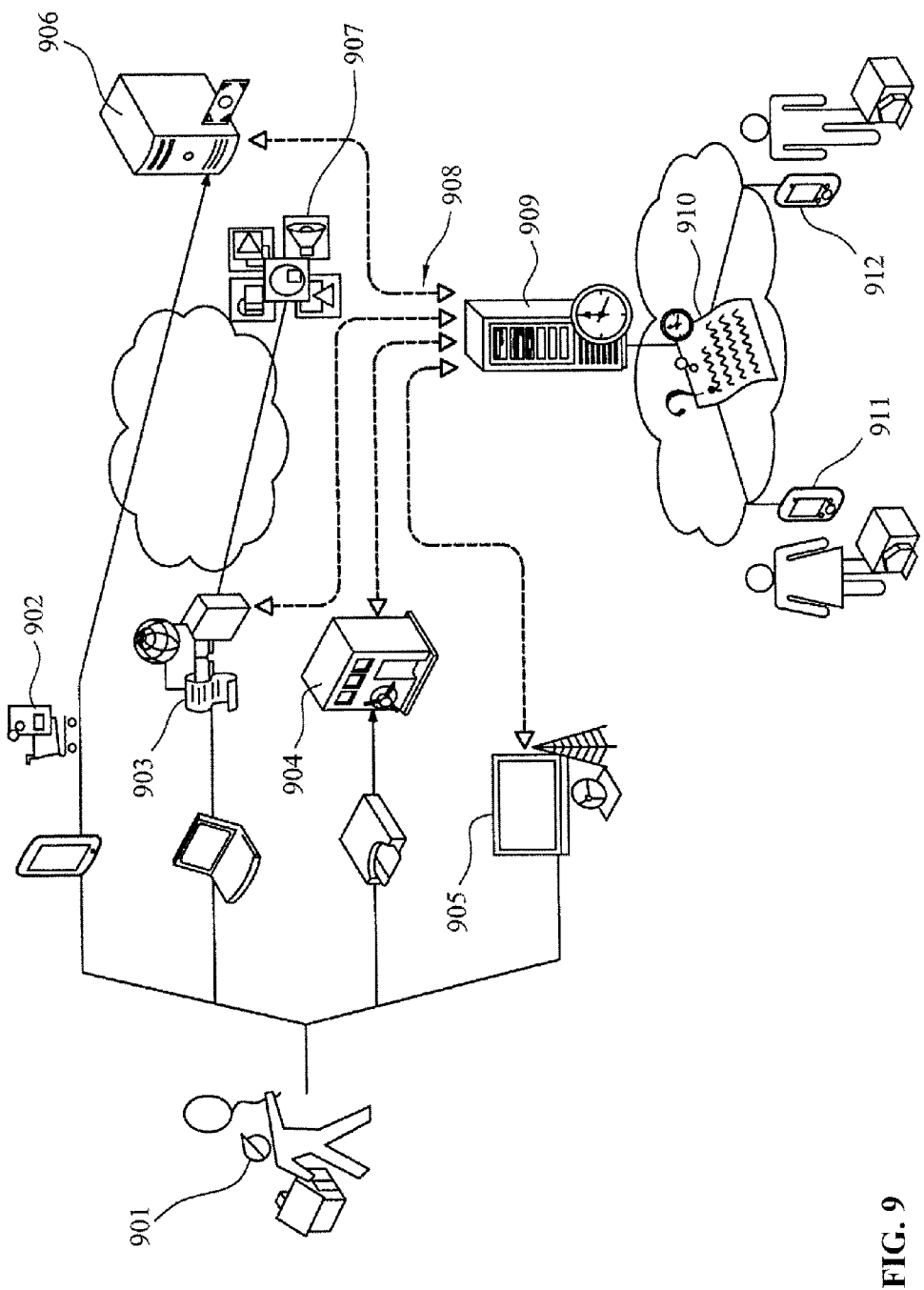
FIG. 9 is a diagram illustrating a method to exercise cooperative parental control in accordance with disclosed embodiments of the invention.

FIG. 9 is a diagram illustrating a method to exercise cooperative parental control in accordance with embodiments of the present invention. At the first step a child or minor 901 initiates a sensitive action in a third party system affiliated to the CBA program (computerized authorization system). In one scenario, the minor's activities may be related to online shopping 902 on a CBA-capable store 906, which in turn sends an ATR to the blocking alarm system (CBAS) 909. In a different scenario the alarm may be triggered when the child 901 attempts to retrieve restricted online content 907, in accordance with the security policies of a proxy server 903 limiting access to certain websites or network content that the parent may deem inappropriate for the child.

Further, in another aspect, a financial institution 904 may place the ATR in the CBAS 909 when the child 901 initiates a credit or debit card transaction. Still further, a TV parental control infrastructure 905, providing a lockout feature on a cable box or other customer media controller, may be enrolled in the CBA program and triggers alarms in the centralized system 909.

Regardless of the source system, the CBAS is instructed 908 to send a request for vote (RFV) 910 to electronic devices of one of the parents or to both of them 911, 912, depending on the behavior stated in the ATR. The third party system controls, by properly setting in the ATR the minimum endorsements required, whether a single-parent acceptance authorizes the action or if both parents must approve it to proceed.

Figure 10:
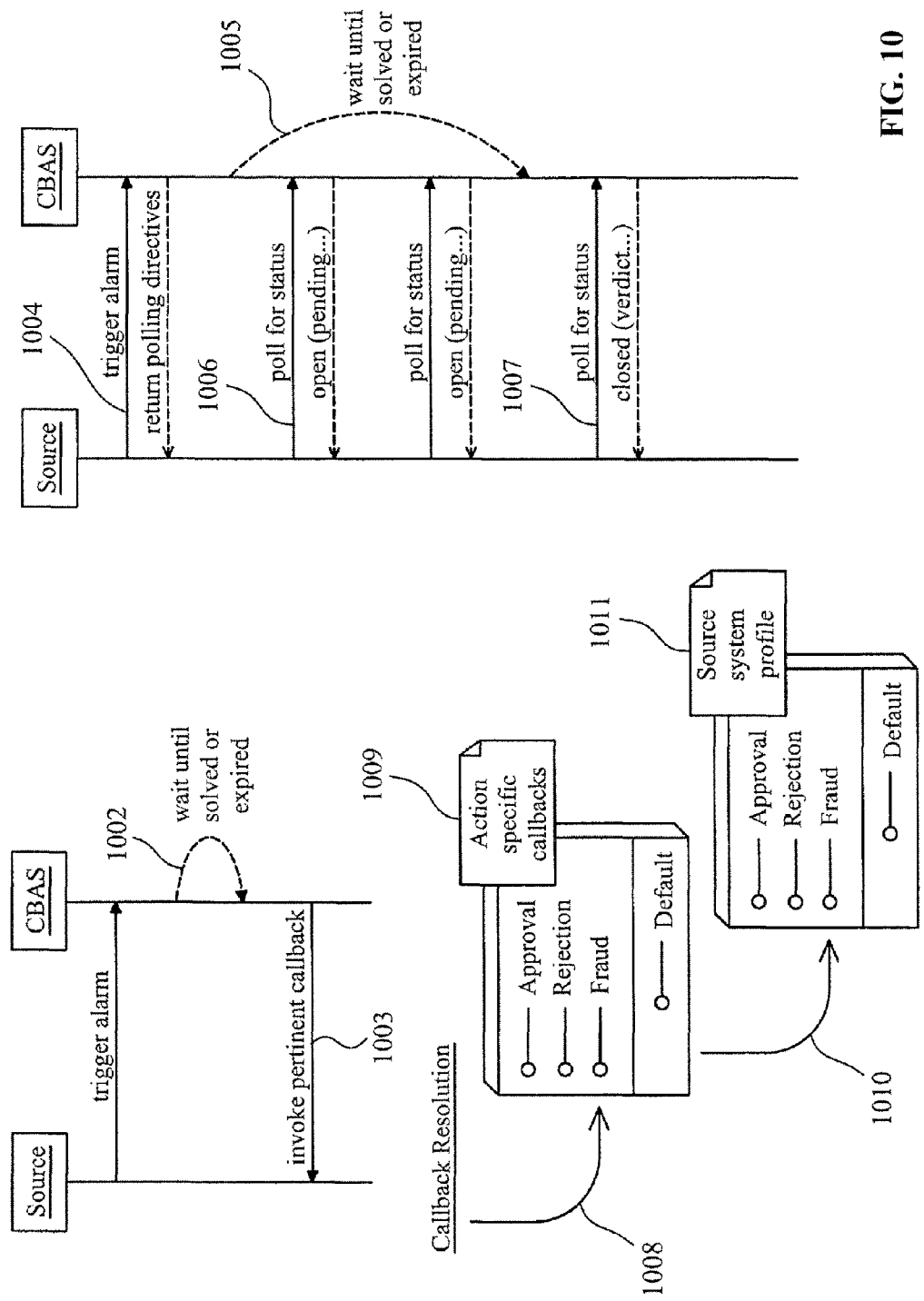
FIG. 10 is a diagram illustrating two variants of a resolution delivery process according to embodiments of the invention.

FIG. 10 illustrates two variants of the resolution delivery process according to specific embodiments of the invention. In the first alternative, a service provider enrolled in the CBA program (the "Source" or electronic entity) triggers an alarm 1001. The centralized blocking alarm system (CBAS) (computerized authorization system) awaits until an authoritative decision has been reached 1002 and then invokes the pertinent callback 1003 on the "Source" system. The callback resolution process will be described in more detail below.

In the second alternative, once the "Source" or electronic entity triggers an alarm 1004, the CBAS includes polling directives in its response. In a preferred embodiment, the CBAS or computerized authorization system supplies a uniform resource locator (URL) so the "Source" can repeatedly issue requests to be informed about the operation progress. Continuing with the diagram of FIG. 10, while the CBAS is computing the votes casted 1005, the "Source" polls for status 1006 until a verdict is reached and the CBAS includes the decision in the response 1007.

Still referring to FIG. 10, the callback resolution process initially attempts to resolve 1008 the "Source" notification channel according to the information 1009 included in the alarm triggering request (ATR). In the event the current ATR does not contains the callback specification segment, the CBAS falls back 1010 to the channels specified in the "Source" affiliated profile 1011.

Figure 11:
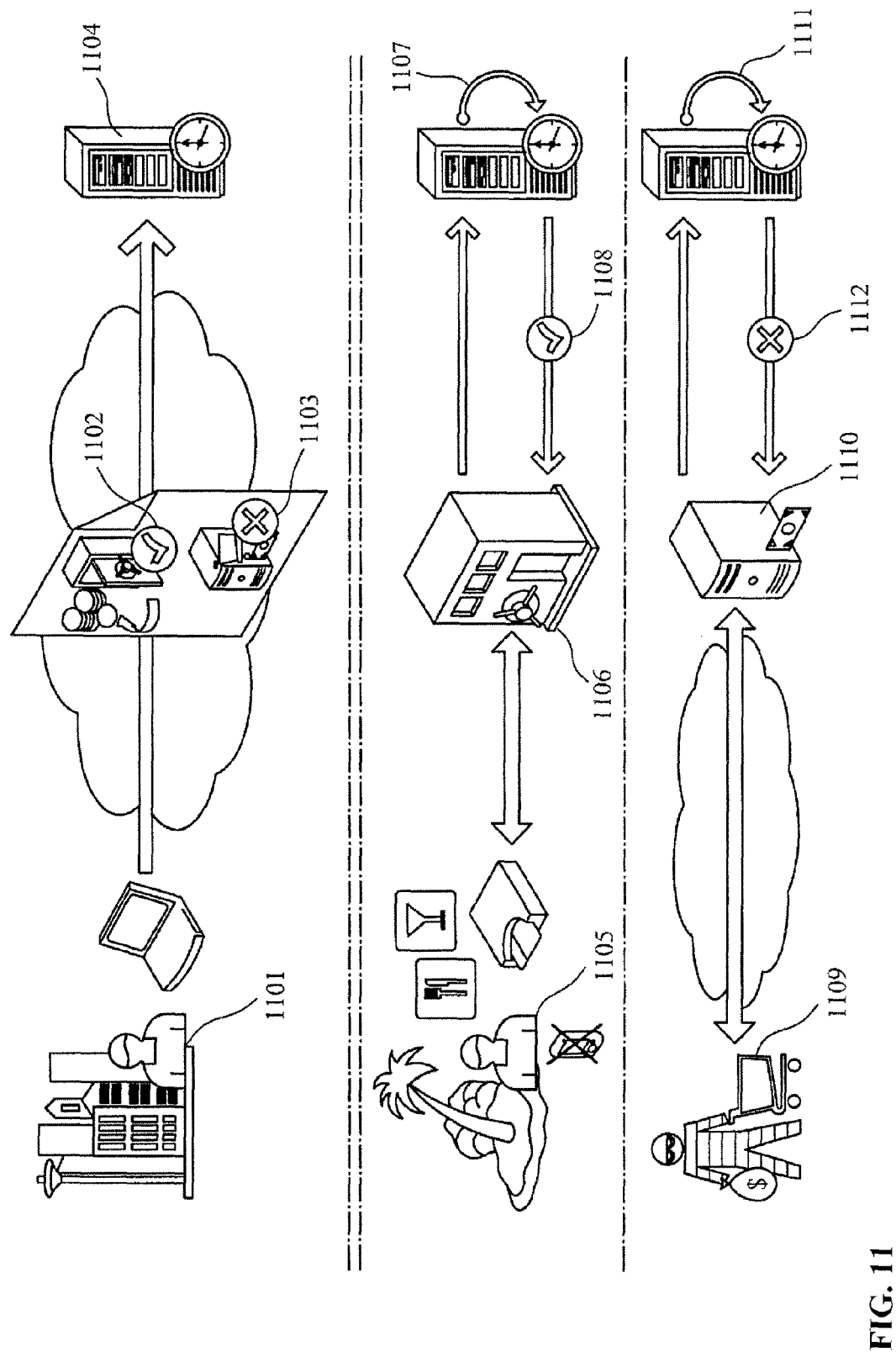
FIG. 11 is a diagram illustrating the resilience of the system to offline environments in accordance with disclosed embodiments of the present invention.

FIG. 11 illustrates the resilience of the computerized authorization system to offline environments in accordance with embodiments of the present invention. Initially, a user enrolled in the CBA program 1101, while being in an online environment, modifies his or her auto-vote settings before going on vacation to a place out of reach of the CBA network, whatever the CBA network embodiment is. The user 1101 instructs the CBAS 1104 (computerized authorization system) to cast an auto-acceptance vote 1102 on every alarm triggered by the financial institution (electronic entity) responsible for his or her credit card, as long as the action informed in the alarm triggering request (ATR) is initiated by a physical point-of-sale (POS). Furthermore, the user instructs the system to otherwise cast an auto-rejection vote 1103 on any e-commerce transaction; this second configuration being not strictly necessary, as the CBA system would reject timed out alarms.

In a second stage, the user being on vacation in an offline environment 1105 is allowed to use his or her credit card at any POS, since the ATR issued by the financial institution 1106 is auto-accepted 1108 by the CBAS, in accordance with the auto-response settings 1107 previously stated by the user. If, meanwhile, a fraudster 1109 attempts to conduct an operation on an electronic commerce business 1110; the CBAS automatically rejects 1112 the transaction, as instructed 111 by the current configuration of the user.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-usable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-usable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-usable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

While the preferred embodiments to the invention has been described, it will be appreciated to those having skill in the art, that many changes may be made to the details without departing from the underlying principles of the invention. The scope of the present invention should, therefore, be determined only by the following claims.

The invention claimed is:

1. A computerized authorization system configured to authorize electronically-made requests made to an electronic entity, the computerized authorization system comprising:
   a hardware storage device, wherein the hardware storage device is configured to store m identifiers of m corresponding predetermined electronic authorization hardware devices, wherein each of the m predetermined electronic authorization hardware devices is associated with one, and only one user, of n users, where m and n are integers, $n \geq 2$, and $n \leq m$;
   one or more processors, wherein the one or more processors is configured to receive an indication of an electronically-made request made to an electronic entity, from the electronic entity;
   wherein each predetermined electronic authorization hardware device, of the m predetermined electronic authorization hardware devices, is configured to receive the indication of the electronically-made request from the one or more processors, and configured to output an authorization of the electronically-made request by the user, of the n users, associated with the each predetermined electronic authorization hardware device, to the one or more processors, upon receipt of an authorization input from the user, of the n users, associated with the each predetermined electronic authorization hardware device:
   wherein when the one or more processors receives the indication of the electronically-made request, from the electronic entity, the one or more processors output the indication of the electronically-made request to the m predetermined electronic authorization hardware devices; and
   wherein when the one or more processors receives one or more authorizations of the electronically-made request from a corresponding one or more predetermined electronic authorization hardware devices of the m predetermined electronic authorization hardware devices, an indication of authorization of the electronically-made request is output to the electronic entity if the one or more authorizations of the electronically-made request received by the one or more processors meet a predetermined criterion,
   wherein the one or more processors is configured to transmit a message to the electronic entity when the one or more processors receive an indication that the electronically-made request is fraudulent from at least one of the m predetermined electronic authorization hardware devices.

2. A computerized authorization system according to claim 1, wherein if the one or more authorizations of the electronically-made request that meet the predetermined criterion is not received from the corresponding one or more predetermined electronic authorization hardware devices of the m predetermined electronic authorization hardware devices within a predetermined time an indication that the electronically-made request is rejected is output to the electronic entity.

3. A computerized authorization system according to claim 1, wherein the message is an indication that the electronically-made request is fraudulent.

4. A computerized authorization system according to claim 1, wherein when the indication that the electronically-made request is fraudulent is received from the at least one of the m predetermined electronic authorization hardware devices, an identity request is made to identify an electronic device that made the electronically-made request and/or a user of the electronic device that made the electronically-made request.

5. A computerized authorization system according to claim 4, wherein the identity request comprises a signal being sent to the electronic device that made the electronically-made request, to capture an image of the user of the electronic device that made the electronically-made request.

6. A computerized authorization system according to claim 1, wherein the m predetermined electronic authorization hardware devices are different devices than an electronic device that made the electronically-made request.

7. A computerized authorization system according to claim 1, wherein the predetermined criterion is the one or more authorizations of the electronically-made request being at least a predetermined number of authorizations of the electronically-made request, wherein a value of the predetermined number of authorizations of the electronically-made request is greater than $n/2$.

8. A computerized authorization system according to claim 7, wherein the hardware storage device is configured to store the value of the predetermined number.

9. A computerized authorization system according to claim 1, wherein at least one of said one or more authorizations of the electronically-made request on behalf of a corresponding at least one of the n users is automatically provided if at least one predetermined user-established criterion is met.

10. A computerized authorization system according to claim 9, wherein the hardware storage device is configured to store the at least one predetermined user-established criterion.

11. A computerized authorization system according to claim 9, wherein the at least one predetermined user-established criterion is set by the m predetermined electronic authorization hardware devices.

12. A computerized authorization system according to claim 1, comprising a plurality of computers and/or servers on a network.

13. The computerized authorization system according to claim 1, further comprising:
   m predetermined electronic authorization hardware devices, wherein each predetermined electronic authorization hardware device of the m predetermined electronic authorization hardware devices comprises:
   an input interface configured to receive, from the one or more processors, the indication of the electronically-made request made to the electronic entity, from a different electronic device;
   a user interface configured to indicate the indication of the electronically-made request and to allow a user to input an authorization input; and
   an output interface configured to output an indication of authorization of the electronically-made request, to the one or more processors;
   wherein when the indication of the electronically-made request is received by each predetermined electronic authorization hardware device, from the one or more processors, at the input interface, the user interface indicates the indication of the electronically-made request; and
   wherein when the user inputs an authorization input, at the input interface, the indication of authorization of the electronically-made request is output to the one or more processors, from the output interface.

14. The computerized authorization system according to claim 1, wherein the indication of the electronically-made request output to the m predetermined electronic authorization hardware devices and the one or more authorizations of the electronically-made request output from a corresponding one or more predetermined electronic authorization hardware devices of the m predetermined electronic authorization hardware devices are transmitted via hypertext transfer secure protocol.

15. A computerized authorization method, the computerized authorization method comprising:
    receiving an indication of an electronically-made request made to an electronic entity, from the electronic entity;
    sending the indication of the electronically-made request to m predetermined electronic authorization hardware devices identified by m corresponding identifiers stored in a hardware storage device, wherein each of the m predetermined electronic authorization hardware devices is associated with one, and only one user, of n users, where m and n are integers, n≥2, and n≤m, wherein each predetermined electronic authorization hardware device, of the m predetermined electronic authorization hardware devices, is configured to receive the indication of the electronically-made request and configured to output an authorization of the electronically-made request by the user, of the n users, associated with the each predetermined electronic authorization hardware device, upon receipt of an authorization input from the user, of the n users, associated with the each predetermined electronic authorization hardware device; and
    receiving one or more authorizations of the electronically-made request from a corresponding one or more predetermined electronic authorization hardware devices of the m predetermined electronic authorization hardware devices;
    sending an indication of authorization of the electronically-made request to the electronic entity, if the one or more authorizations of the electronically-made request meet a predetermined criterion; and
    transmitting a message to the electronic entity if an indication that the electronically-made request is fraudulent is received from at least one of the predetermined electronic authorization hardware devices of the m predetermined electronic authorization hardware devices.

16. A computerized authorization method according to claim 15, further comprising:
    sending an indication that the electronically-made request is rejected, to the electronic entity, if the one or more authorizations of the electronically-made request meeting the predetermined criterion is not received from the one or more predetermined electronic authorization hardware devices of the m predetermined electronic authorization hardware devices within a predetermined time.

17. A computerized authorization method according to claim 15, wherein the message is an indication that the electronically-made request is fraudulent.

18. A computerized authorization method according to claim 15, further comprising:
    making an identity request to identify an electronic device that made the electronically-made request and/or a user of the electronic device that made the electronically-made request.

19. A computerized authorization method according to claim 18, wherein making the identity request comprises sending a signal to the electronic device that made the electronically-made request, to capture an image of the user of the electronic device that made the electronically-made request.

20. A computerized authorization method according to claim 15, wherein the m predetermined electronic authorization hardware devices are different devices than an electronic device that made the electronically-made request.

21. A computerized authorization method according to claim 15, wherein the predetermined criterion is the one or more authorizations of the electronically-made request being at least a predetermined number of authorizations of the electronically-made request, wherein a value of the predetermined number of authorizations of the electronically-made request is greater than n/2.

22. A computerized authorization method according to claim 21, comprising storing the value of the predetermined number in the hardware storage device.

23. A computerized authorization method according to claim 15, further comprising automatically providing at least one of said one or more authorizations of the electronically-made request on behalf of a corresponding at least one of the n users if at least one predetermined user-established criterion is met.

24. A computerized authorization method according to claim 23, further comprising storing the at least one predetermined user-established criterion in the hardware storage device.

25. A computerized authorization method according to claim 24, further comprising the m predetermined electronic authorization hardware devices setting the at least one predetermined user-established criterion.

26. A computerized authorization method according to claim 15, wherein
    sending the indication of the electronically-made request to m predetermined electronic authorization hardware devices identified by m corresponding identifiers stored in the hardware storage device; and
    receiving one or more authorizations of the electronically-made request from the corresponding one or more predetermined electronic authorization hardware devices of the m predetermined electronic authorization hardware devices
is carried out by a plurality of computers and/or servers on a network.

27. The computerized authorization method according to claim 15, wherein the indication of the electronically-made request sent to the m predetermined electronic authorization hardware devices and the one or more authorization of the electronically-made request received from a corresponding one or more predetermined electronic authorization hardware device of the m predetermined electronic authorization hardware devices are transmitted via hypertext transfer secure protocol.

28. A non-transitory computer-readable medium containing a set of instructions that when executed cause a computer to perform a method comprising:
    receiving an indication of an electronically-made request made to an electronic entity, from the electronic entity;
    sending the indication of the electronically-made request to m predetermined electronic authorization hardware devices identified by m corresponding identifiers stored in a hardware storage device, wherein each of the m predetermined electronic authorization hardware devices is associated with one, and only one user, of n users, where m and n are integers, n≥2, and n≤m, wherein each predetermined electronic authorization hardware device, of the m predetermined electronic authorization hardware devices, is configured to receive the indication of the electronically-made request and configured to output an authorization of the electronically-made request by the user, of the n users, associated with the each predetermined electronic authorization hardware device, upon receipt of an authorization input from the user, of the n users, associated with the each predetermined electronic authorization hardware device;

receiving one or more authorizations of the electronically-made request from a corresponding one or more predetermined electronic authorization hardware devices of the m predetermined electronic authorization hardware devices;

sending an indication of authorization of the electronically-made request to the electronic entity, if the one or more authorizations of the electronically-made request meet a predetermined criterion; and transmitting a message to the electronic entity if an indication that the electronically-made request is fraudulent is received from at least one of the predetermined electronic authorization hardware devices of the m predetermined electronic authorization hardware devices.

* * * * *

UNITED STATES PATENT AND TRADEMARK OFFICE
CERTIFICATE OF CORRECTION

| | | |
|---|---|---|
| PATENT NO. | : 8,719,907 B2 | Page 1 of 1 |
| APPLICATION NO. | : 13/469780 | |
| DATED | : May 6, 2014 | |
| INVENTOR(S) | : Gary Martin Shannon | |

It is certified that error appears in the above-identified patent and that said Letters Patent is hereby corrected as shown below:

In the Specification

Column 2,
Line 42, "c-commerce" should read --e-commerce--.

Column 14,
Line 39, "program," should read --program.--.

Signed and Sealed this
Fourteenth Day of October, 2014

Michelle K. Lee
*Deputy Director of the United States Patent and Trademark Office*